US012662363B2

(12) United States Patent
Gaunt et al.

(10) Patent No.: US 12,662,363 B2
(45) Date of Patent: Jun. 23, 2026

(54) FLUID DISPENSING SYSTEM WITH DUAL OUTLET TANDEM FAST FLOW

(71) Applicant: Midea Group Co., Ltd., Foshan (CN)

(72) Inventors: Michael Gaunt, Louisville, KY (US); Eric L. Scalf, Louisville, KY (US)

(73) Assignee: Midea Group Co., Ltd., Foshan (CN)

( * ) Notice: Subject to any disclaimer, the term of this patent is extended or adjusted under 35 U.S.C. 154(b) by 142 days.

(21) Appl. No.: 18/800,387

(22) Filed: Aug. 12, 2024

(65) Prior Publication Data

US 2026/0042658 A1 Feb. 12, 2026

(51) Int. Cl.
*B67D 1/12* (2006.01)
*B67D 1/00* (2006.01)

(52) U.S. Cl.
CPC ......... *B67D 1/1202* (2013.01); *B67D 1/0014* (2013.01)

(58) Field of Classification Search
CPC .. B67D 1/0014; B67D 1/1202; B67D 1/1204; B67D 1/1218; B67D 2001/1263; B67D 2210/00118
USPC ......... 222/1, 55, 56, 61, 71, 173, 179.5, 255
See application file for complete search history.

(56) References Cited

U.S. PATENT DOCUMENTS 4,651,862 A * 3/1987 Greenfield, Jr. ..... B67D 1/1297 222/2
6,321,782 B1 11/2001 Hollister
6,830,062 B2 12/2004 Montpetit
9,783,405 B2 10/2017 Olson et al.
10,563,909 B2 2/2020 Scalf et al.
10,724,645 B2 7/2020 Konaka et al.
10,955,187 B2 3/2021 Scalf
12,168,600 B1 * 12/2024 Melkonian ......... G05D 23/1393
2014/0138400 A1 * 5/2014 Donner ................. B05C 5/0291 222/23
2015/0041005 A1 * 2/2015 Orita .................... B67D 1/0431 137/565.11
2016/0052769 A1 * 2/2016 Orita .................... B67D 1/0807 222/129
2018/0327247 A1 * 11/2018 Newton ............... B67D 1/1204
2020/0182535 A1 6/2020 Scalf
2023/0064175 A1 3/2023 Scalf et al.
2024/0253971 A1 * 8/2024 Cortese ................ B67D 1/1234

FOREIGN PATENT DOCUMENTS

CN 2849372 Y 12/2006

* cited by examiner

*Primary Examiner* — Luan K Bui
(74) *Attorney, Agent, or Firm* — Dinsmore & Shohl LLP

(57) ABSTRACT

A fluid dispensing system, including a reservoir tank in fluid communication with a tank port; a reservoir tube having a first end in fluid communication with the reservoir tank; a tank dispense valve in fluid communication with the second end of the reservoir tube; a plumbing tube; and a connector having a first input defining a first channel, a second input defining a second channel, and an outlet. The first input is in fluid communication with the tank dispense valve, the second input is in fluid communication with the plumbing tube, and the outlet is positioned proximate the second channel at an output point. The first channel and the second channel are sized to provide a first fluid flow rate from the tank dispense valve to the output point that is greater than a second fluid flow rate from the plumbing tube to the output point.

20 Claims, 5 Drawing Sheets

FLUID DISPENSING SYSTEM WITH DUAL OUTLET TANDEM FAST FLOW

TECHNICAL FIELD

The present specification generally relates to fluid dispensing systems for home appliances and refrigerators.

BACKGROUND

Residential refrigerators generally include both fresh food compartments and freezer compartments, with the former maintained at a temperature above freezing to store fresh foods and liquids, and the latter maintained at a temperature below freezing for longer-term storage of frozen foods. Many residential refrigerators also include as a convenience feature an integrated dispenser for dispensing a fluid (e.g., water) and/or ice. In addition, some refrigerators incorporate a water tank or other fluid storage receptacle that may be fixed or removable, and positioned within a cooled compartment of the refrigerator to cool the contained fluid prior to dispensing or otherwise serving (e.g., in the case where the receptacle is removable). However, in many cases such dispensers are only capable of dispensing fluids at lower flow rates, and as a result, filling larger containers from a dispenser can take an inordinate amount of time with many dispensers.

SUMMARY

In a first embodiment, a fluid dispensing system includes a reservoir tank in fluid communication with a tank port. The fluid dispensing system includes a reservoir tube having a first end in downstream fluid communication with the reservoir tank at the tank port and a second end opposite the first end. A tank dispense valve is positioned in downstream fluid communication with the second end of the reservoir tube. Furthermore, the fluid dispensing system includes a plumbing tube and a connector having a first input defining a first channel, a second input defining a second channel, and an outlet. The first input is in fluid communication with the tank dispense valve, the second input is in fluid communication with the plumbing tube, and the outlet is positioned opposite the first input and the second input to position the first channel proximate the second channel at an output point. Additionally, the first channel and the second channel are sized to provide a first fluid flow rate from the tank dispense valve to the output point that is greater than a second fluid flow rate from the plumbing tube to the output point.

In another embodiment, the fluid dispensing system includes a selectively removable reservoir tank in fluid communication with a tank port. There is a reservoir tube including a first end in downstream fluid communication with the reservoir tank at the tank port and a second end opposite the first end. The fluid dispensing system includes a tank dispense valve in downstream fluid communication with the second end of the reservoir tube. Furthermore, the system includes a plumbing tube and a connector having a first input defining a first channel, a second input defining a second channel, and an outlet. The first input is in fluid communication with the tank dispense valve, the second input is in fluid communication with the plumbing tube, and the outlet is positioned opposite the first input and the second input to position the first channel proximate the second channel at an output point. Additionally, the first channel and the second channel are sized to provide a first fluid flow rate from the tank dispense valve to the output point that is greater than a second fluid flow rate from the plumbing tube to the output point. Furthermore, the tank dispense valve supplies the first fluid flow to the first channel at the first fluid flow rate and the plumbing tube supplies a second fluid flow to the second channel at the second fluid flow rate in tandem to combine the first fluid flow and the second fluid flow together to dispense through the outlet at a fast flow rate or the tank dispense valve remains closed while the plumbing tube supplies a second fluid flow to the second channel at the second fluid flow rate to dispense through the outlet at a slow flow rate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Traditional water dispensing systems are often limited by the limited flow rate entering the dispensing system from a filtered water line. In-line filters present a bottleneck, thereby restricting the incoming flow rate into the fluid dispensing system. To overcome limited incoming flow rates, water dispensing systems have been modified to include additional water reservoir tanks to dispense water from the tanks to a user at a greater volumetric rate than is possible by dispensing straight from the user's filtered water line. These tanks are typically located inside the refrigerator door and filled with water directly from the incoming filtered water line at its usual capacity. Water can then be dispensed from the tank through a water dispensing feature to the user directly from the tank. The water dispensed in this way is dispensed at a greater volumetric flow rate than can be achieved through an in-line filter.

Additionally, based on this approach, these reservoir tank dispensing systems require sealing the tank port affixed within the "dock" upon which the tank sits, to prevent water from flowing through the tank port when the reservoir tank is not present. Thus, the user cannot continue to dispense water from a single dispensing feature when the reservoir tank is removed. Instead, the user must either reinstall the reservoir tank or use an alternative dispensing feature to dispense water while the tank is removed.

According to the present disclosure, the fluid dispensing system taught herein provides benefits over traditional reservoir tank designs. The fluid dispensing system provides an additional, water line tank dispense valve in tandem with the reservoir tank dispense valve to achieve dual tandem flow, thereby increasing the volumetric output compared to either a traditional reservoir tank design or a standard water line dispensing design. Moreover, the advantage of the present invention lies in not requiring a seal for the tank port, as the plumbing tube can be used to dispense water on its own to achieve a "slow flow" if desired by the consumer or if the tank has been removed from the dock. Additionally, the reservoir tank will not be back-filled during the dispensing process. Instead, the water line valve dispenses through an additional, smaller tube to produce a larger overall, tandem flow rate rather than dispensing from each dispensing feature individually.

Embodiments of fluid dispensing systems will now be described in additional detail herein. The following will now describe these systems, and methods with reference to the drawings, where like numbers refer to like structures.

Figure 1:
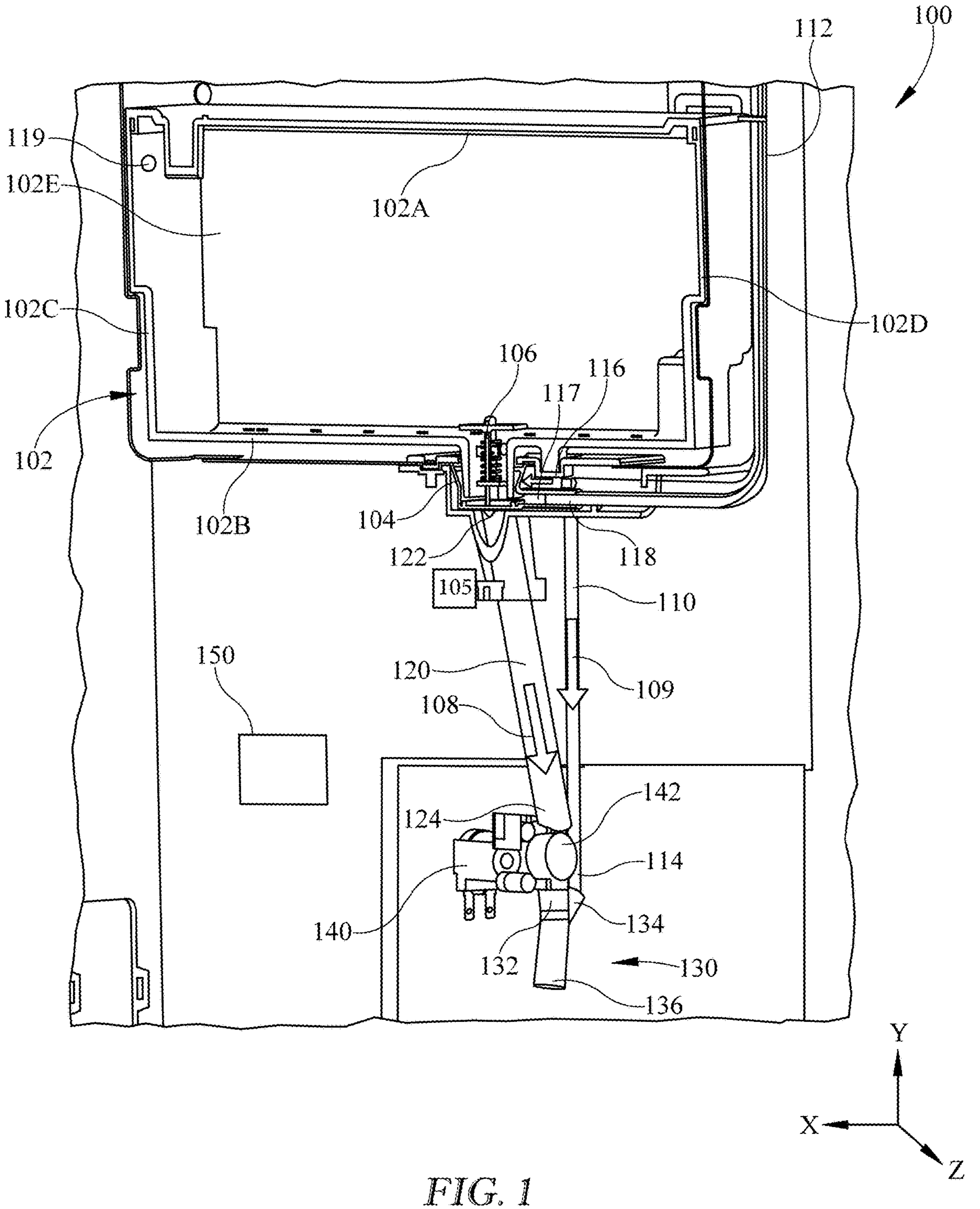
FIG. 1 depicts a cross-sectional view of a water dispensing system, according to one or more embodiments shown and described herein.
Figure 2:
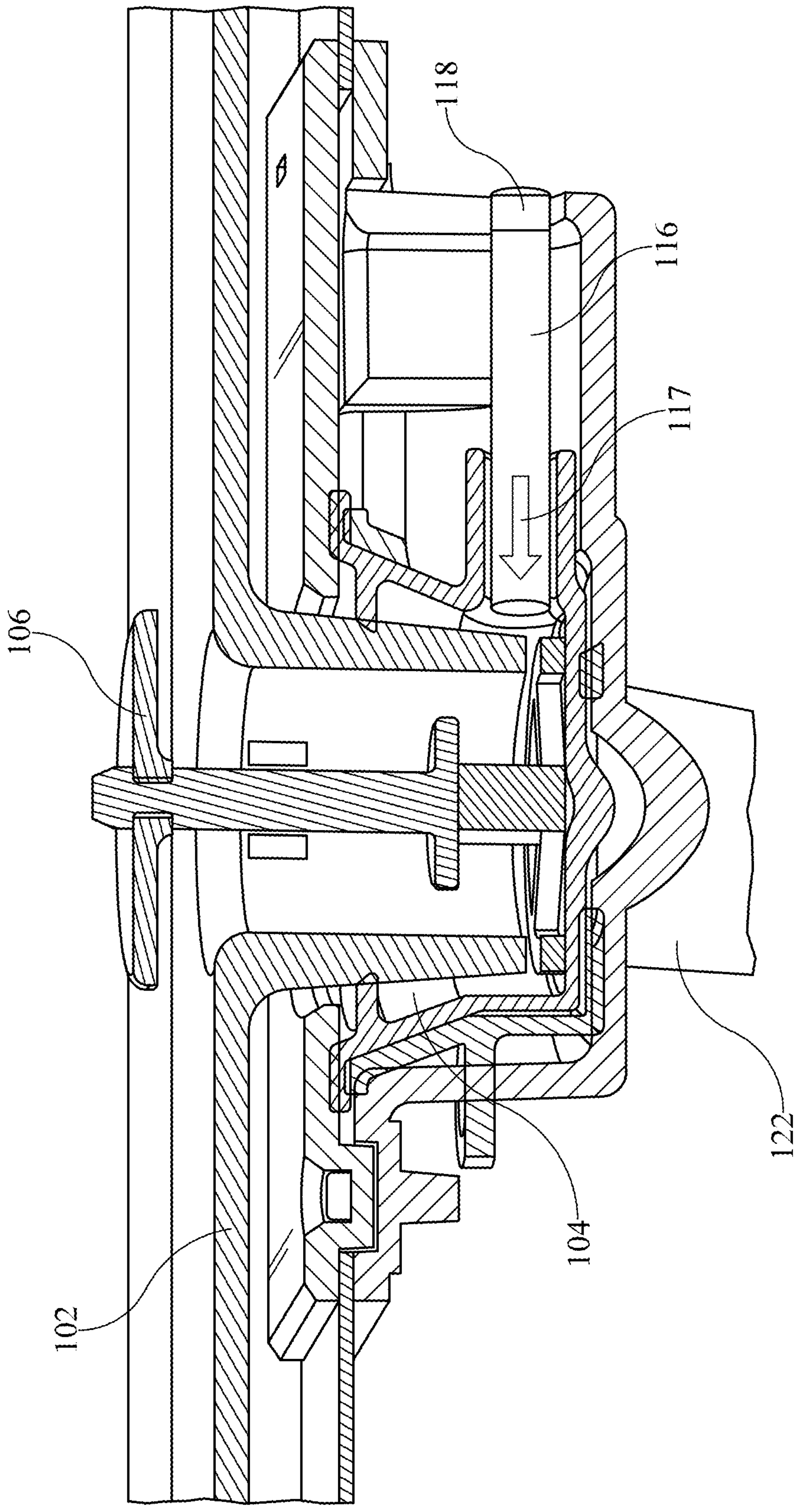
FIG. 2 depicts a cross-sectional view of the reservoir tank and the tank port, according to one or more embodiments shown and described herein.

As depicted in FIGS. 1-2, a fluid dispensing system 100 is described herein for selectively varying a fluid dispensing rate according to a user's need. The fluid dispensing system 100 comprises a reservoir tank 102 in fluid communication with a tank port 104. The reservoir tank 102 may be a blow-molded plastic container or an injection molded container configured to retain a fluid, such as water. Additionally, the reservoir tank 102 may be a bladder with variable dimensions made from rubber or other any suitable materials that may expand or collapse based upon the volume of a retained fluid. In embodiments where the reservoir tank is formed from a rigid structure, the reservoir tank 102 may include walls such as a first side wall 102C, a second side wall 102D, a front wall (not shown), a rear wall (102E), a lid 102A, and a base 102B. In some embodiments, the fluid dispensing system 100 may be used in conjunction with a refrigerator such that the reservoir tank 102 may be mounted to a tank port 104 on the refrigerator to couple the reservoir tank 102 with an internally-accessible or externally-accessible fluid dispenser disposed on a door or case of a refrigerator to dispense water or any other fluid to a user. The reservoir tank 102 may be positioned within or about the refrigerator at a variety of positions. In some embodiments, the reservoir tank 102 may be mounted to an interior door of the refrigerator, may be positioned on a shelf within the refrigerator, may be positioned on an external surface of a the refrigerator, or may be disposed at any other suitable location to enable fluid communication with the fluid dispenser.

The interior volume of the reservoir tank 102 may be a variety of sizes. For example, the interior volume may vary based on the mounting or storage location of the reservoir tank 102. In some embodiments, the reservoir tank 102 may hold greater than or equal to half a gallon, greater than or equal to 1 gallon, greater than or equal to 2 gallons, greater than or equal to 2.5 gallons, or even greater than or equal to 5 gallons. The total volume of the reservoir tank 102 or any sub-portion thereof may be dispensed to create a first fluid flow 108 from the reservoir tank 102. In embodiments, the entire volume of the reservoir tank 102 may be dispensed prior to refilling. While in other embodiments only a portion of the volume of the reservoir tank 102 may be dispensed prior to refilling. The reservoir tank 102 can be refilled between dispensing steps from an additional water source, such as via a tank fill tube 116. In embodiments, the fluid dispensing system 100 may include the plumbing tube 110 and the tank fill tube 116 fluid communication with one another upstream of the reservoir tank 102, but the plumbing tube 110 and the tank fill tube 116 may branch to form the distinct plumbing tube 110 in fluid communication with the connector 130 and the distinct tank fill tube 116 to refill the reservoir tank 116. In other embodiments, the plumbing tube 110 and the tank fill tube 116 may be distinct throughout the fluid dispensing system 100.

Still referring to FIGS. 1-2, in embodiments the reservoir tank 102 may be a selectively removable reservoir tank 102 in fluid communication with a tank port 104. The selectively removable tank 102 allows the user to remove the reservoir tank 102 for cleaning, filling, or other forms of maintenance. The reservoir tank 102 may mate with the tank port 104 along the base 102B of the reservoir tank 102 such the reservoir tank 102 mates with the tank port 104 by insertion along the Y-axis. The selectively removable reservoir tank 102 further comprises a seal assembly 106 to selectively close the reservoir tank 102 when the reservoir tank 102 has been removed from the tank port 104. In embodiments, the seal assembly 106 includes a manual plug, stopper, or threaded cap manually applied by a user to seal an opening along the base 102B of the reservoir tank 102, the tank port 104, or both. In some embodiments, the seal assembly 106 may include a self-sealing plug actuated via a spring-loaded mechanism, a pneumatic mechanism or other similar mechanical means to seal an opening along the base 102B of the reservoir tank 102, the tank port 104, or both. In embodiments with self-sealing seal assemblies 106, the seal assembly 106 is normally biased to a closed position and is movable to an open position when the reservoir tank 102 is properly seated in the tank port 104. In some embodiments, the seal assembly 106 includes a spring-loaded plunger having a sealing surface that seals an opening along the base 102B of the reservoir tank 102, the tank port 104, or both when in the closed position. The spring-loaded plunger is movable along the Y-axis, and the tank port 104 includes an actuator to engage and operate the spring-loaded plunger along the Y-axis when the reservoir tank 102 is coupled with the tank port 104.

The reservoir tank 102 may be vertically positioned at an uppermost point along the Y-axis within the fluid dispensing system 100 to enable gravity to direct a first fluid to exit the reservoir tank 102 through the tank port 104 coupled to the base 102B of the reservoir tank 102. In some embodiments, the fluid dispensing system 100 may include a pump 105 to selectively direct a first fluid flow 108 from the reservoir tank 102 to the output point 139. The reservoir tank 102 may be positioned in upstream fluid communication with a reservoir tube 120, a tank dispense valve 140 and a connector 130, all positioned vertically below the reservoir tank 102 along the Y-axis to direct the first fluid from the reservoir tank 102 to an output point 139 of the connector 130 via gravity. In other embodiments, the fluid dispensing system 100 may include a pump (not shown) in fluid communication with the reservoir tank 102 to direct the first fluid from the reservoir tank 102, through the reservoir tube 120, the tank dispense valve 140, the connector 130 to dispense the first fluid via the output point 139 of the connector 130.

Still referring to FIGS. 1-2, the reservoir tube 120 includes a first end 122 in downstream fluid communication with the reservoir tank 102 at the tank port 104 and a second end 124 opposite the first end 122 in fluid communication with the tank dispense valve 140. The reservoir tube 120 may be positioned along the Y-axis below the reservoir tank 102 but above the tank dispense valve 140 to place the reservoir tank 102 in fluid communication with the tank dispense valve 140. The reservoir tube 120 is sized to enable a first fluid flow 108 rate to the tank dispense valve 140 that is greater than the fluid flow rate of a traditional plumbing tube 110. In embodiments, the first fluid flow 108 rate is provided from the reservoir tank 102 through the reservoir tube 120 to the tank dispense valve 140 via gravity, thereby increasing the fluid output from output point 139 of the first fluid flow 108 as a function of the diameter of the reservoir tube 120 and the volume of fluid retained in reservoir tank 102.

Figure 3:
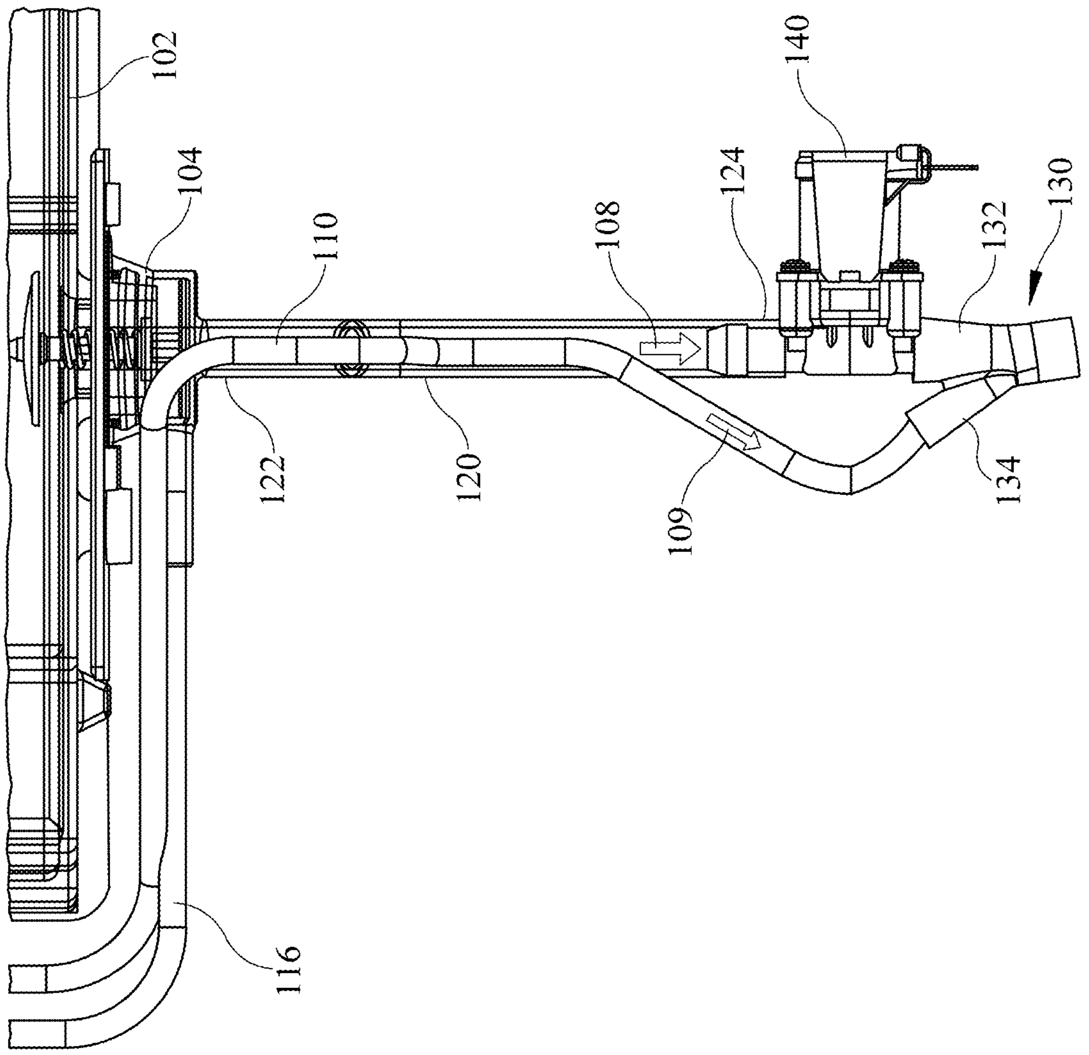
FIG. 3 depicts an isometric view of the reservoir tube and plumbing tube, according to one or more embodiments shown and described herein.
Figure 4:
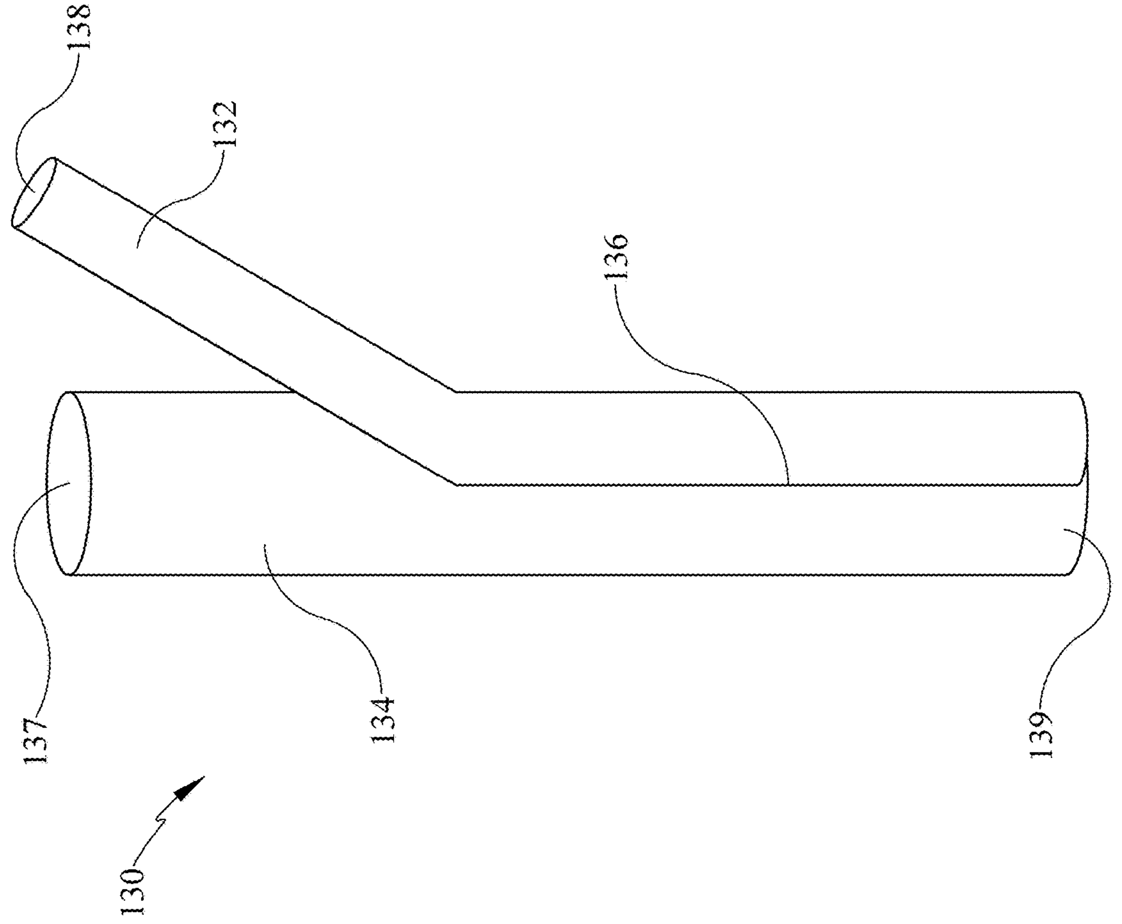
FIG. 4 depicts an isometric view of a connector, according to one or more embodiments shown and described herein.
Figure 5B:
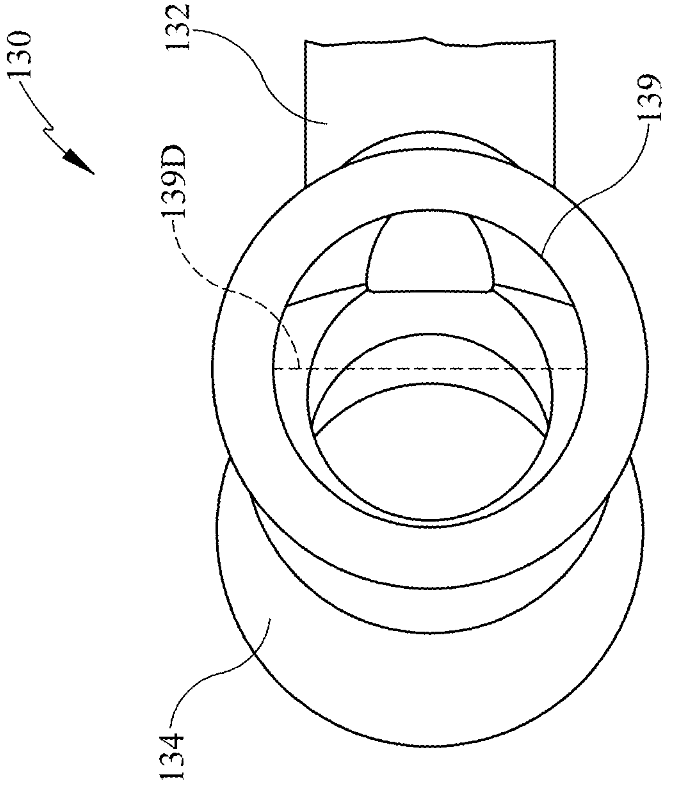
FIG. 5B depicts a bottom, isometric view of a connector, according to one or more embodiments shown and described herein.
Figure 5A:
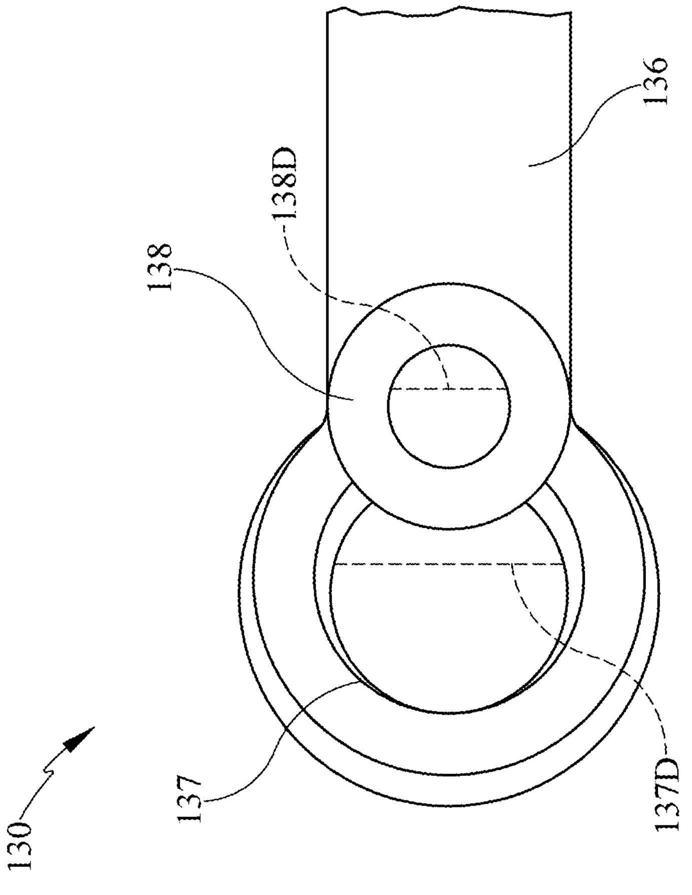
FIG. 5A depicts a top, isometric view of a connector, according to one or more embodiments shown and described herein.

Referring to FIGS. 1 and 3, the tank dispense valve 140 is positioned in downstream fluid communication with the second end 124 of the reservoir tube 120. The tank dispense valve 140 is coupled to a first input 132 of the connector 130 such that the tank dispense valve 140 directs the first fluid flow 108 to the first channel 137 at the first fluid flow 108 rate. The tank dispense valve 140 may be operatively connected to the second end 124 of the reservoir tube 120 to enable selective control of the first fluid flow 108 into the first channel 137 of the connector 130. In embodiments, the tank dispense valve 140 may allow for binary on or off control of the first fluid flow 108 through the tank dispense valve 140. While in other embodiments, the tank dispense valve 140 may enable a user to dynamically alter the first fluid flow 108 rate to be a fraction of the maximum first fluid flow 108 rate. In some embodiments, the tank dispense valve 140 may be operated via fractional turns, such as a ½, ⅓, or ¼ turn to adjust the fluid flow rate through the tank dispense valve 140. The first fluid flow 108 rate from the tank dispense valve 140 can be adjusted (e.g. decreased and/or increased) depending on the desired amount of water to be dispensed into the first channel 137 of the connector 130. For example, the tank dispense valve 140 can be positioned in a closed position to completely restrict the first fluid flow 108 through the tank dispense valve 140. The tank dispense valve 140 can be positioned in an open position to allow a maximum first fluid flow 108 through the tank dispense valve 140. In some embodiments, the tank dispense valve 140 can be positioned at one or more intermediate positions between the closed position and open position to selectively adjust the first fluid flow 108 rate into the first channel 137. The duration of supplying the first fluid flow 108 from the reservoir tank 102 may be manually controlled by the user or may be automatically controlled by a controller 150. The user may open and close the tank dispense valve 140 to quickly dispense the entirety or a portion of the first fluid within the reservoir tank 102. In other embodiments, dispensing of the first fluid flow 108 may be automated. For example, the first fluid flow 108 may be dispensed for a predetermined duration or to output a predetermined volume. The tank dispense valve 140 may be electronically activated via a controller 150. In some embodiments, the controller 150 may automatically execute one or more dispensing programs to control the first fluid flow 108. While in other embodiments, a user may direct the controller 150 to execute one or more dispensing programs via a user interface, external device, or any other equivalent methods. In embodiments, the tank dispense valve 140 may be selectively opened or closed via a solenoid valve.

Referring to FIGS. 1-3, the fluid dispensing system 100 may further include a plumbing tube 110 to introduce water from an external source into the fluid dispensing system 100. The plumbing tube 110 may be a standard plumbed water line in fluid communication with a building's main pressurized water supply. In embodiments, the plumbing tube 110 may be directly coupled to a filter (not shown) to introduce potable water into the fluid dispensing system 100. The plumbing tube 110 is positioned in fluid commutation with the connector 130 so that the plumbing tube 110 supplies a second fluid flow 109 to the second channel 138 at a second fluid flow 109 rate. In embodiments, the plumbing tube 110 may be routed to selectively supply multiple components within the fluid dispensing system 100. In some embodiments, one plumbing tube 110 may be in fluid communication with the connector 130 and the reservoir tank 102 to fill the reservoir tank 102 between dispensing steps. In other embodiments, two distinct plumbing tubes 110 are used to dispense a second fluid flow 109 through the connector 130 and to fill the reservoir tank 102 between dispensing steps.

The plumbing tube 110 may include a first end 112 positioned proximate the reservoir tank 102 through which water or any other fluid may enter the fluid dispensing system 100. The plumbing tube 110 also includes a second end 114 opposite the first end 112 in fluid communication with the second input 134 of the connector 130. The plumbing tube 110 may be routed in any configuration around the reservoir tank 102, the reservoir tube 120, the tank dispense valve 140, or any other component of the fluid dispensing system 100.

In embodiments, the tank dispense valve 140 may additionally be in fluid communication with the plumbing tube 110 to operatively control the second fluid flow 109 through the plumbing tube 110. The tank dispense valve 140 may allow for binary on or off control of the second fluid flow 109 through the tank dispense valve 140. While in other embodiments, the tank dispense valve 140 may enable a user to dynamically alter the second fluid flow 109 rate to be a fraction of the maximum second fluid flow 109 rate. In some embodiments, the tank dispense valve 140 may be operated via fractional turns, such as a ½, ⅓ or ¼ turns to adjust the second fluid flow 109 rate through the tank dispense valve 140. The second fluid flow 109 rate from the tank dispense valve 140 can be adjusted (e.g. decreased and/or increased) depending on the desired amount of water to be dispensed into the second channel 138 of the connector 130. For example, the tank dispense valve 140 can be positioned in a closed position to completely restrict the second fluid flow 109 through the tank dispense valve 140. The tank dispense valve 140 can be positioned in an open position to allow a maximum second fluid flow 109 through the tank dispense valve 140. In some embodiments, the tank dispense valve 140 can be positioned at one or more intermediate positions between the closed position and open position to selectively adjust the second fluid flow 109 rate into the second channel 138. The duration of supplying the second fluid flow 109 from the plumbing tube 110 may be manually controlled by the user or may be automatically controlled by a controller 150. The user may open and close the tank dispense valve 140 to dispense the second fluid flow 109. In other embodiments, dispensing of the second fluid flow 109 may be automated. For example, the second fluid may be dispensed for a predetermined duration or to output a predetermined volume. The tank dispense valve 140 may be electronically activated via a controller 150. In some embodiments, the controller 150 may automatically execute one or more dispensing programs to control the second fluid flow 109. While in other embodiments, a user may direct the controller 150 via a user input to execute one or more dispensing programs via a user interface, external device, or any other equivalent methods. In embodiments, the tank dispense valve 140 may be selectively opened or closed via a solenoid valve. In other embodiments, the plumbing tube 110 may include a separate plumbing valve (not shown) to independently control the second fluid flow 109 to the second channel 138 through the plumbing tube 110. The plumbing valve (not shown) may function according to the structure and methods described herein pertaining to the tank dispense valve 140.

As illustrated in FIGS. 3-5B, the fluid dispensing system 100 further includes the connector 130; its first input 132 defining the first channel 137, its second input 134 defining the second channel 138, and an outlet 136 defining an output point 139. The first input 132 is positioned to be in fluid communication with the tank dispense valve 140 such that the first fluid flow 108 passing from the reservoir tank 102, through the reservoir tube 120, and through the tank dispense valve 140, enters the connector 130 via the first channel 137. Likewise, the second input 134 is in fluid communication with the plumbing tube 110 such that the second fluid flow 109 passes from the plumbing tube 110, through the tank dispense valve 140 or through a separate plumbing valve (not shown) to enter the connector 130 via the second channel 138. The outlet 136 is positioned opposite the first input 132 and the second input 134 to position the first channel 137 proximate the second channel 138 at the output point 139.

The first channel 137 and the second channel 138 are sized relative to one another such that the first channel 137 provides a first fluid flow 108 with a first fluid flow 108 rate from the tank dispense valve 140 to the output point 139 that is greater than the second fluid flow 109 rate of the second fluid flow 109 from the plumbing tube 110 provided to the output point 139 by the second channel 138. The ratio of the first diameter 137D of the first channel 137 to the second diameter 138D of the second channel 138 is greater than or equal to approximately 1.5, greater than or equal to approximately 3, greater than or equal to approximately 5, greater than or equal to approximately 7.5, or even greater than or equal to approximately 10. In some embodiments, the third diameter 139D of the output point 139 is larger than first diameter 137D or the second diameter 138D. In some embodiments, the first channel 137 and the second channel 138 are initially distinct at the first input 132 and the second input 134 respectively. However, the first channel 137 and the second channel 138 merge within the outlet 136 to place the first channel 137 and the second channel 138 in fluid communication and to form a single output point 139. In some embodiments, the first channel 137 and the second channel 138 remain entirely distinct throughout the connector 130. In such embodiments, the outlet 136 may define two distinct output points 139 for the first channel 137 and the second channel 138 respectively.

The fluid dispensing system 100 has the added benefit of enabling variable fluid dispensing rates according to the structure described herein. The connector 130 enables the first fluid flow 108 originating from the reservoir tank 102 to be combined and output in tandem with the second fluid flow 109 originating from the plumbing tube 110. The connector 130 can dispense the combined first fluid flow 108 and the second fluid flow 109 through the output point 139 of the outlet 136 at a fast flow rate that is greater than the first fluid flow 108 rate or the second fluid flow 109 rate individually. As discussed hereinabove, each of the first fluid flow 108 and the second fluid flow 109 may be controlled via the tank dispense valve 140, a plumbing valve (not shown) or any other suitable valve, pump, pressure input, or the like to further adjust the fast flow rate through the output point 139. Additionally, the fluid dispensing system 100 enables the user, the controller 150, or both to close the tank dispense valve 140 to restrict the first fluid flow 108 from the reservoir tank 102 during the dispensing step. The tank dispense valve 140 can remain completely closed or partially closed to the first fluid flow 108 while the plumbing tube 110 supplies the second fluid flow 109 to the second channel 138 at the standard second fluid flow rate to dispense through the output point 139 at a slow flow rate. In embodiments, the slow flow rate is approximately equal to the standard flow rate from a traditional water dispensing line. In some embodiments, the fluid dispensing system 100 has the additional benefit of enabling fluid dispensing even when the reservoir tank 102 is removed from the tank port 104 because each of the first channel 137 and the second channel 138 are fed independently. Accordingly, the second fluid flow 109 can dispense through the outlet 136 and its output point 139 at the slow flow rate when the reservoir tank 102 has been selectively removed.

As depicted in FIGS. 1-3, in some embodiments the fluid dispensing system 100 includes a tank fill tube 116 in fluid communication with the plumbing tube 110 and the reservoir tank 102. In embodiments, the tank fill tube 116 may extend through the first side wall 102C, the second side wall 102D, or the lid 102A of the reservoir tank 102 to the plumbing tube 110 to fill the reservoir tank 102 after some or all of the volume of the reservoir tank 102 has been dispensed. In embodiments, the tank fill tube 116 may extend through the tank port 104 to fill the reservoir tank 102 through the tank base 102B. The tank fill tube 116 may further include a tank fill valve 118 to selectively control a third fluid flow 117 from the plumbing tube 110 to the reservoir tank 102. During dispensing, the tank fill valve 118 remains closed as the first fluid flow 108 or the second fluid flow 109 are supplied to the connector 130 so that the water from the plumbing tube 110, entering the fluid dispensing system 100, is prioritized for the second fluid flow 109 to ensure the availability of the maximum fast flow or the maximum slow flow. Accordingly, the tank fill valve 118 is only operated when the fluid dispensing system 100 is not actively dispensing the first fluid flow 108 or the second fluid flow 109. In some embodiments, a fluid level sensor 119, is a conductivity sensor or an ultrasonic sensor positioned to sense a water surface within reservoir tank 102 mounted on any of the first side wall 102C, the second side wall 102D, the front wall (not shown), or the back wall (not shown). In some embodiments, the fluid level sensor 119 is a magnetic float sensor, or another suitable sensor positioned within the reservoir tank 102 to detect a fluid level to determine a volume of fluid exiting the reservoir tank 102 during dispensing. The fluid level sensor 119 may communicate data with the controller 150 to enable the controller 150 to determine the appropriate operation of the tank dispense valve 140, the plumbing valve (not shown), the tank fill valve 118, or any other valve or mechanism of the fluid dispensing system 100. It should be appreciated that volume measurements may be desirable in some embodiments to provide feedback to a user as to the amount of fluid being dispensed and/or to provide a measured fill capability whereby the dispenser automatically shuts off when a user-selected amount of fluid has been dispensed. In other embodiments, however, no volume measurements may be used, although it may still be desirable to include a fluid level sensor 119.

Referring again to FIG. 1, the fluid dispensing system 100 includes one or more controllers 150 to selectively control a position of the tank dispense valve 140 or any other valve to communicate the first fluid flow 108 from the reservoir tank 102 to the first channel 137 and to selectively communicate the second fluid flow 109 from the plumbing tube 110 to the second channel 138 according to a user input. The user may direct the controller 150 to execute one or more dispensing programs via a user interface, external device, or any other equivalent methods. In other embodiments, the controller 150 may automatically execute one or more dispensing programs to control the first fluid flow 108, the second fluid flow 109, or the third fluid flow 117 via the tank dispense valve 140, the plumbing valve (not shown), or the tank fill valve 118. In a non-limiting embodiment, the controller 150 automatically activates the tank fill valve 118 to communicate the third fluid flow 117 from the plumbing tube 110 to the reservoir tank 102 according to a measured fluid level from the fluid level sensor 119 positioned within the reservoir tank 102. In some embodiments, the controller 150 may also communicate with one or more other sensors positioned to sense environmental conditions inside of and/or external to fluid dispensing system 100, e.g., one or more temperature sensors, humidity sensors, etc. The sensors may also include additional types of sensors such as door switches, fail-safe switches, and other status sensors pertaining to the fluid dispensing system 100.

In some embodiments, controller 150 may also be coupled to one or more network interfaces (not shown), e.g., for interfacing with external devices via wired and/or wireless networks such as Ethernet, Wi-Fi, Bluetooth, NFC, cellular and other suitable networks. In some embodiments, the fluid dispensing system 100 may directly communicate via a home automation network, and various communication protocols may be supported, including various types of home automation communication protocols. In other embodiments, other wireless protocols, e.g., Wi-Fi or Bluetooth, may be used.

Further aspects of the embodiments described herein are provided by the subject matter of the following clauses:

Clause 1—A fluid dispensing system, comprising: a reservoir tank in fluid communication with a tank port; a reservoir tube further comprising a first end in downstream fluid communication with the reservoir tank at the tank port and a second end opposite the first end; a tank dispense valve in downstream fluid communication with the second end of the reservoir tube; a plumbing tube; and a connector further comprising a first input defining a first channel, a second input defining a second channel, and an outlet; wherein the first input is in fluid communication with the tank dispense valve, the second input is in fluid communication with the plumbing tube, and the outlet is positioned opposite the first input and the second input to position the first channel proximate the second channel at an output point; and wherein the first channel and the second channel are sized to provide a first fluid flow rate from the tank dispense valve to the output point that is greater than a second fluid flow rate from the plumbing tube to the output point.

Clause 2—The fluid dispensing system of claim 1, wherein the first channel and the second channel are in fluid communication within the connector.

Clause 3—The fluid dispensing system of any preceding claim, wherein the first channel and the second channel remain distinct throughout the connector.

Clause 4—The fluid dispensing system of any preceding claim, wherein the ratio of the diameter of the first channel to the diameter of the second channel is greater than or equal to approximately 1.5.

Clause 5—The fluid dispensing system of any preceding claim, wherein the reservoir tube and the connector are positioned vertically below the reservoir tank along a y-axis to direct a first fluid flow from the reservoir tank to the output point via gravity.

Clause 6—The fluid dispensing system of any preceding claim, further comprising a pump 105 to selectively direct a first fluid flow from the reservoir tank to the output point.

Clause 7—The fluid dispensing system of any preceding claim, wherein the tank dispense valve supplies the first fluid flow to the first channel at the first fluid flow rate and the plumbing tube supplies a second fluid flow to the second channel at the second fluid flow rate in tandem to combine the first fluid flow and the second fluid flow together to dispense through the outlet at a fast flow rate.

Clause 8—The fluid dispensing system of any preceding claim, wherein the tank dispense valve remains closed while the plumbing tube supplies a second fluid flow to the second channel at the second fluid flow rate to dispense through the outlet at a slow flow rate.

Clause 9—The fluid dispensing system of any preceding claim, further comprising a controller operatively coupled to the tank dispense valve to control a position of the tank dispense valve according to a user input.

Clause 10—The fluid dispensing system of any preceding claim, further comprising a tank fill tube in fluid communication with the plumbing tube and the reservoir tank.

Clause 11—The fluid dispensing system of any preceding claim, wherein the tank fill tube further comprises a tank fill valve to selectively control a third fluid flow from the plumbing tube to the reservoir tank.

Clause 12—The fluid dispensing system of any preceding claim, wherein the tank fill valve is closed when the first fluid flow or the second fluid flow are supplied to the connector.

Clause 13—The fluid dispensing system of any preceding claim, further comprising a controller to automatically activate the tank fill valve to communicate the third fluid flow from the plumbing tube to the reservoir tank according to a measured fluid level within the reservoir tank.

Clause 14—A fluid dispensing system, comprising: a selectively removable reservoir tank in fluid communication with a tank port; a reservoir tube further comprising a first end in downstream fluid communication with the selectively removable reservoir tank at the tank port and a second end opposite the first end; a tank dispense valve in downstream fluid communication with the second end of the reservoir tube; a plumbing tube; and a connector further comprising a first input defining a first channel, a second input defining a second channel, and an outlet; wherein the first input is in fluid communication with the tank dispense valve, the second input is in fluid communication with the plumbing tube, and the outlet is positioned opposite the first input and the second input to position the first channel proximate the second channel at an output point; wherein the first channel and the second channel are sized to provide a first fluid flow rate from the tank dispense valve to the output point that is greater than a second fluid flow rate from the plumbing tube to the output point; and wherein the tank dispense valve supplies the first fluid flow to the first channel at the first fluid flow rate and the plumbing tube supplies a second fluid flow to the second channel at the second fluid flow rate in tandem to combine the first fluid flow and the second fluid flow together to dispense through the outlet at a fast flow rate or the tank dispense valve remains closed while the plumbing tube supplies a second fluid flow to the second channel at the second fluid flow rate to dispense through the outlet at a slow flow rate.

Clause 15—The fluid dispensing system of claim 14, wherein the second fluid flow can dispense through the outlet at the slow flow rate when the selectively removable reservoir tank is removed.

Clause 16—The fluid dispensing system of any preceding claim, wherein the selectively removable reservoir tank further comprises a seal assembly to selectively close the selectively removable reservoir tank when the selectively removable reservoir tank is removed from the tank port.

Clause 17—The fluid dispensing system of any preceding claim, wherein the seal assembly comprises a manual plug, stopper, or threaded cap applied by a user.

Clause 18—The fluid dispensing system of any preceding claim, wherein the seal assembly comprises a self-sealing plug actuated via a spring-loaded mechanism, a pneumatic mechanism or other similar system.

Clause 19—The fluid dispensing system of any preceding claim, wherein the first channel and the second channel are in fluid communication within the connector.

Clause 20—The fluid dispensing system of any preceding claim, wherein the first channel and the second channel remain distinct throughout the connector.

Clause 21—The fluid dispensing system of any preceding claim, wherein the ratio of the diameter of the first channel to the diameter of the second channel is greater than or equal to approximately 1.5.

Clause 22—The fluid dispensing system of any preceding claim, wherein the reservoir tube and the connector are positioned vertically below the selectively removable reservoir tank along a y-axis to direct a first fluid flow from the selectively removable reservoir tank to the output point via gravity.

Clause 23—The fluid dispensing system of any preceding claim, wherein the selectively removable reservoir tank is positioned within a refrigerator.

Clause 24—The fluid dispensing system of any preceding claim, further comprising a tank fill tube in fluid communication with the plumbing tube and the selectively removable reservoir tank.

Clause 25—The fluid dispensing system of any preceding claim, further comprising a controller operatively coupled to the tank dispense valve to control a position of the tank dispense valve according to a user input.

Clause 26—The fluid dispensing system of any preceding claim, wherein the controller detects a presence of the selectively removable reservoir tank and biases the tank dispense valve when the presence of the selectively removable reservoir tank is not detected.

Clause 27—The fluid dispensing system of any preceding claim, wherein the tank fill tube further comprises a tank fill valve to selectively control a third fluid flow from the plumbing tube to the selectively removable reservoir tank.

Clause 28—The fluid dispensing system of any preceding claim, wherein the tank fill valve is closed when the first fluid flow or the second fluid flow are supplied to the connector.

Clause 29—The fluid dispensing system of any preceding claim, wherein the tank fill valve is closed when the selectively removable reservoir tank is removed.

Clause 30—The fluid dispensing system of any preceding claim, further comprising a controller to automatically activate the tank fill valve to communicate the third fluid flow from the plumbing tube to the selectively removable reservoir tank according to a measured fluid level within the selectively removable reservoir tank Clause 31—The fluid dispensing system of any preceding claim, wherein the reservoir tank is positioned within a refrigerator.

Clause 32—A method for dispensing fluid, the method comprising the steps of: providing a dispensing system, wherein the dispensing system comprises a reservoir tank in upstream fluid communication with a first input of a connector, a plumbing tube in upstream fluid communication with a second input of the connector, a tank dispense valve in fluid communication with at least the reservoir tank and the first input, and a tank fill tube comprising a tank fill valve in fluid communication with the plumbing tube and the reservoir tank; supplying a second fluid flow from the plumbing tube to the second input of the connector to dispense the second fluid flow from an output point defined by an outlet of the connector; selectively actuating the dispense valve to supply a first fluid flow from the reservoir tank to the first input of the connector to dispense in tandem with the second fluid flow from the output point; positioning the dispense valve at a closed position to dispense the second fluid flow from the output point at a slow flow rate and positioning the dispense valve at an open position to dispense the first fluid flow and the second fluid flow together at a fast flow rate greater than the slow flow rate; closing the tank fill valve during the supplying the second fluid flow from the plumbing tube to the second input and opening the tank fill valve to automatically supply a third fluid flow from the plumbing tube to the reservoir tank according to a measured fluid level within the reservoir tank.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A fluid dispensing system, comprising:

a reservoir tank in fluid communication with a tank port;

a reservoir tube further comprising a first end in downstream fluid communication with the reservoir tank at the tank port and a second end opposite the first end;

a tank dispense valve in downstream fluid communication with the second end of the reservoir tube;

a plumbing tube; and a connector further comprising a first input defining a first channel, a second input defining a second channel, and an outlet;

wherein the first input is in fluid communication with the tank dispense valve, the second input is in fluid communication with the plumbing tube, and the outlet is positioned opposite the first input and the second input to position the first channel proximate the second channel at an output point; and wherein the first channel and the second channel are sized to provide a first fluid flow rate from the tank dispense valve to the output point that is greater than a second fluid flow rate from the plumbing tube to the output point.

2. The fluid dispensing system of claim 1, wherein the first channel and the second channel are in fluid communication within the connector.

3. The fluid dispensing system of claim 1, wherein the first channel and the second channel remain distinct throughout the connector.

4. The fluid dispensing system of claim 1, wherein a ratio of a diameter of the first channel to a diameter of the second channel is greater than or equal to approximately 1.5.

5. The fluid dispensing system of claim 1, wherein the reservoir tube and the connector are positioned vertically below the reservoir tank along a y-axis to direct a first fluid flow from the reservoir tank to the output point via gravity.

6. The fluid dispensing system of claim 1, further comprising a pump to selectively direct a first fluid flow from the reservoir tank to the output point.

7. The fluid dispensing system of claim 1, wherein the tank dispense valve supplies a first fluid flow to the first channel at the first fluid flow rate and the plumbing tube supplies a second fluid flow to the second channel at the second fluid flow rate in tandem to combine the first fluid flow and the second fluid flow together to dispense through the outlet at a fast flow rate.

8. The fluid dispensing system of claim 1, wherein the tank dispense valve remains closed while the plumbing tube supplies a second fluid flow to the second channel at the second fluid flow rate to dispense through the outlet at a slow flow rate.

9. The fluid dispensing system of claim 1, further comprising a controller operatively coupled to the tank dispense valve to control a position of the tank dispense valve according to a user input.

10. The fluid dispensing system of claim 1, further comprising a tank fill tube in fluid communication with the plumbing tube and the reservoir tank.

11. The fluid dispensing system of claim 10, wherein the tank fill tube further comprises a tank fill valve to selectively control a third fluid flow from the plumbing tube to the reservoir tank.

12. A fluid dispensing system, comprising:

a selectively removable reservoir tank in fluid communication with a tank port;

a reservoir tube further comprising a first end in downstream fluid communication with the selectively removable reservoir tank at the tank port and a second end opposite the first end;

a tank dispense valve in downstream fluid communication with the second end of the reservoir tube;

a plumbing tube; and a connector further comprising a first input defining a first channel, a second input defining a second channel, and an outlet;

wherein the first input is in fluid communication with the tank dispense valve, the second input is in fluid communication with the plumbing tube, and the outlet is positioned opposite the first input and the second input to position the first channel proximate the second channel at an output point;

wherein the first channel and the second channel are sized to provide a first fluid flow rate from the tank dispense valve to the output point that is greater than a second fluid flow rate from the plumbing tube to the output point; and wherein the tank dispense valve supplies a first fluid flow to the first channel at the first fluid flow rate and the plumbing tube supplies a second fluid flow to the second channel at the second fluid flow rate in tandem to combine the first fluid flow and the second fluid flow together to dispense through the outlet at a fast flow rate or the tank dispense valve remains closed while the plumbing tube supplies the second fluid flow to the second channel at the second fluid flow rate to dispense through the outlet at a slow flow rate.

13. The fluid dispensing system of claim 12, wherein the second fluid flow can dispense through the outlet at the slow flow rate when the selectively removable reservoir tank is removed.

14. The fluid dispensing system of claim 12, wherein the selectively removable reservoir tank further comprises a seal assembly to selectively close the selectively removable reservoir tank when the selectively removable reservoir tank is removed from the tank port.

15. The fluid dispensing system of claim 12, wherein the selectively removable reservoir tank is positioned within a refrigerator.

16. The fluid dispensing system of claim 12, further comprising a tank fill tube in fluid communication with the plumbing tube and the selectively removable reservoir tank.

17. The fluid dispensing system of claim 12, further comprising a controller operatively coupled to the tank dispense valve to control a position of the tank dispense valve according to a user input.

18. The fluid dispensing system of claim 17, wherein the controller detects a presence of the selectively removable reservoir tank and biases the tank dispense valve when the presence of the selectively removable reservoir tank is not detected.

19. The fluid dispensing system of claim 16, wherein the tank fill tube further comprises a tank fill valve to selectively control a third fluid flow from the plumbing tube to the selectively removable reservoir tank.

20. A method for dispensing fluid, the method comprising the steps of:

providing a dispensing system, wherein the dispensing system comprises a reservoir tank in upstream fluid communication with a first input of a connector, a plumbing tube in upstream fluid communication with a second input of the connector, a tank dispense valve in fluid communication with at least the reservoir tank and the first input, and a tank fill tube comprising a tank fill valve in fluid communication with the plumbing tube and the reservoir tank;

supplying a second fluid flow from the plumbing tube to the second input of the connector to dispense the second fluid flow from an output point defined by an outlet of the connector;

selectively actuating the tank dispense valve to supply a first fluid flow from the reservoir tank to the first input of the connector to dispense in tandem with the second fluid flow from the output point;

positioning the tank dispense valve at a closed position to dispense the second fluid flow from the output point at a slow flow rate and positioning the tank dispense valve at an open position to dispense the first fluid flow and the second fluid flow together at a fast flow rate greater than the slow flow rate; and closing the tank fill valve during the supplying the second fluid flow from the plumbing tube to the second input and opening the tank fill valve to automatically supply a third fluid flow from the plumbing tube to the reservoir tank according to a measured fluid level within the reservoir tank.

* * * * *